(12) United States Patent
Joerck

(10) Patent No.: US 6,417,798 B1
(45) Date of Patent: Jul. 9, 2002

(54) METHOD AND APPARATUS FOR POSITION AND ATTITUDE CONTROL OF A SATELLITE

(75) Inventor: Hartmut Joerck, Wiemersdorf (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/691,425

(22) Filed: Oct. 18, 2000

(30) Foreign Application Priority Data

Oct. 18, 1999 (DE) .......................................... 199 50 247

(51) Int. Cl.$^7$ .......................... H04B 7/185; B64G 1/00; G06F 17/00; G01C 21/00
(52) U.S. Cl. ..................... 342/355; 244/158 R; 701/13; 701/222
(58) Field of Search .......................... 342/355; 701/222, 701/226, 13; 244/158 R

(56) References Cited

U.S. PATENT DOCUMENTS

| 4,801,202 | A |   | 1/1989  | Wilcox              |
| 5,109,346 | A | * | 4/1992  | Wertz ........................ 701/222 |
| 5,687,084 | A | * | 11/1997 | Wertz ........................ 701/222 |
| 5,821,526 | A |   | 10/1998 | Krishna             |
| 5,852,792 | A | * | 12/1998 | Nielson ...................... 701/222 |
| 6,047,226 | A | * | 4/2000  | Wu et al. .................... 701/13 |
| 6,108,594 | A | * | 8/2000  | Didinsky et al. ............. 701/13 |
| 6,113,034 | A | * | 9/2000  | Basuthakur et al. ......... 701/13 |

* cited by examiner

Primary Examiner—Gregory C. Issing
(74) Attorney, Agent, or Firm—W. F. Fasse; W. G. Fasse

(57) ABSTRACT

An apparatus for regulating or controlling a satellite includes: at least one sensor for detecting reference targets such as stars, which is connected to arrangements for selecting and determining the position of reference targets, and to an arrangement for estimating model parameters of the satellite and of external interferences; a memory for storing a reference target catalog and a reference trajectory; a regulating unit for regulating the position of the satellite; and a filter that is connected to the arrangement for position determination of the reference targets, the arrangements for estimating the model parameters, the memory and the regulating unit. A method for regulating a satellite's position includes the following steps: detecting, determining the position of, and selecting reference targets; estimating model parameters of the satellite and external interferences; calculating the present position and/or attitude and motion conditions of the satellite on the basis of the estimated model parameters with the aid of dynamic models of the satellite motion; comparing the determined positions of selected reference targets with stored reference target data; and correcting the calculated position and/or attitude and motion conditions dependent on the result of the comparison. Such an apparatus and method achieve a high accuracy by successively updating and improving the accuracy of the reference target data.

11 Claims, 3 Drawing Sheets

METHOD AND APPARATUS FOR POSITION AND ATTITUDE CONTROL OF A SATELLITE

PRIORITY CLAIM

This application is based on and claims the priority under 35 U.S.C. § 119 of German Patent Application 199 50 247.1, filed on Oct. 18, 1999, the entire disclosure of which is incorporated herein by reference.

FIELD OF THE INVENTION

The invention relates to a method and an apparatus for regulating or controlling the position, attitude and motion of a satellite by detecting reference targets, such as stars for example.

BACKGROUND INFORMATION

It is generally known in the prior art to use stars as reference targets. These reference targets are detected, and then the detected data relating to targets are evaluated, in order to provide a regulation or control of a satellite. For example, U.S. Pat. No. 4,801,202 (Wilcox) and U.S. Pat. No. 5,821,526 (Krishna) each respectively disclose a method of evaluating star data in such a manner.

A problem or shortcoming of position determinations in space in general, and particularly in connection with the above mentioned prior art references, is that only a relative position of a star or the like with respect to the position of the satellite can be determined. In this context, the respective positions of the satellites and of the stars are only known with a limited degree of accuracy. Moreover, various interfering influences have an effect on a given satellite and thus change the motion of the satellite relative to the desired path, whereby such interfering influences make it more difficult to determine the position of stars relative to the desired satellite position.

SUMMARY OF THE INVENTION

In view of the above it is an object of the invention to provide a method and an apparatus for regulating or controlling a satellite, which enables achieving the highest possible accuracy of the position regulation for the satellite. The invention further aims to avoid or overcome the disadvantages of the prior art, and to achieve additional advantages, as apparent from the present specification.

The above objects have been achieved according to the invention in an apparatus for controlling or regulating a satellite, comprising: at least one sensor for detecting reference targets such as stars, connected with an arrangement for selecting reference targets, and an arrangement for determining the respective position of the reference targets, which generally is achieved relative to the satellite coordinate system; an arrangement for estimating or evaluating model parameters of the satellite and external interferences that have an influence on the satellite, through parameter identification; a first memory storing a reference target catalog; a second memory storing a reference trajectory, which may be in the form of a concrete description or definition of the reference trajectory path, or of a calculation rule for calculating the reference trajectory; a regulating unit that is connected to actuators or position control units for regulating or controlling the position of the satellite; and a filter which contains models of the satellite motion and of the external interferences that have an influence on the satellite, and which is connected to the arrangement for position determination of the reference targets, the arrangement for estimating or evaluating the model parameters, the first memory, and the regulating unit. As a result of the models, condition or state values for the external interferences and for the satellite motion are provided.

In such an apparatus according to the invention, not only are reference targets, such as stars for example, detected, selected and their positions determined, but also model parameters, such as the moment of inertia of the satellite for example, and parameters characterizing the external interferences that hate an influence on the satellite, such as magnetic forces, gravitational forces, the solar wind, etc., for example, are additionally estimated or evaluated in an appropriate arrangement and can therefore be used for improving the state or condition values which are provided as a result of the models. A reference target catalog provides further references for a position determination and position or attitude regulation. Using the filter, a current or present position of the satellite can be calculated from the estimated values and then compared by using the reference target catalog. By comparison with the reference trajectory stored in the second memory, a position and attitude regulation of the satellite can be achieved using a regulating unit.

In order to simplify the apparatus, it can be provided that the filter, the arrangement for position determination of the reference targets, and the arrangement for selecting reference targets are combined together in an extended filter arrangement. Furthermore, also the arrangement for estimating or evaluating the condition parameters and the external interferences can be integrated in this extended filter arrangement. In this context, either the filter itself can be embodied as a Kalman filter, or the extended filter arrangement can be embodied as an extended Kalman filter.

The actuators or the position control units or the like that are connected to the regulating unit may be any type of engines, for example electrical engines, of the satellite. In order to achieve the finest possible control of the effectiveness of the several engines, the invention further provides that the engines are tiltable or pivotable between a common main thrust direction and a thrust direction that is tilted or inclined relative to the main thrust direction. With such an arrangement, in order to achieve the greatest thrust possible, the respective thrust direction of all the engines is directed in a common direction, or in order to achieve a reduced thrust and finer control thereof, the engines may be tilted or pivoted relative to each other to achieve an effective resultant thrust that is smaller than the sum of the individual thrusts of the individual engines, because components of these individual thrusts partially compensate or counteract each other. Also, with an appropriate adjustment of the engines, instead of a straight linear force being applied to the satellite, it is alternatively possible to exert a rotational moment onto the satellite. Thus, with a suitable engine adjustment, a controlled rotation of the satellite is respectively possible about each of the three axes.

The above objects have further been achieved according to the invention in a method of regulating or controlling a satellite, comprising the following steps: detecting, selecting and determining the position of reference targets such as stars; evaluating or estimating model parameters of the satellite and external interferences that have an influence on the satellite; calculating current or present position, attitude and motion conditions of the satellite and external interference conditions on the basis of the estimated model parameters by means of dynamic models of the satellite motion; comparing the detected positions of selected reference targets with stored reference target data; and correcting the calculated position, attitude and motion conditions dependent on the results of the comparison.

Thus, on the one hand, the present or current model parameters are taken into account in the context of an estimation, from which present position, attitude and motion conditions can be calculated with the aid of dynamic models, and external interference conditions can be calculated also with the aid of corresponding models. In this context, these position, attitude and motion conditions and also the external interference conditions, to the extent applicable in a given case, can be further corrected to approach the actually existing conditions by carrying out a comparison of the measured reference targets with the stored reference target data. Since, however, the stored reference target data, such as star charts for example, generally themselves are subject to a certain degree of inaccuracy or uncertainty, it is advantageous that a correction and therewith an improvement of the stored reference target data can be carried out on the basis of the comparison and therewith the newly measured reference target data. Thus, the above described process not only more exactly or accurately determines the present position, attitude and motion conditions of the satellite and also the external interference conditions, in any case where applicable, while taking into consideration the stored reference target data, but also in the opposite sense it is possible to carry out a more exact determination of the stored reference target data.

The results of these correction steps can thereby be still further improved in that the individual calculation and correction steps are multiply or repetitively carried out in an iterative manner. Thereby, also the estimated model parameters are newly determined dependent on the corrected results and adapted to the corrected values. Then, on the basis of this corrected estimation, a renewed calculation of the present position, attitude, and motion conditions of the satellite, and also the external interference conditions, if applicable, is carried out, and then again a renewed comparison of the measured reference target data with the stored reference target data is carried out. Then, once again, dependent on the comparison results, a correction step for the position, attitude and motion conditions and also for the external interference conditions as applicable, as well as for the stored reference target data, can be carried out.

The position regulation or control of the satellite especially shall serve to maintain the satellite as well as possible on the ideal motion path, i.e. trajectory or orbit, that has been prescribed for it. This position regulation is achieved dependent on a comparison of the calculated present position, attitude, and motion condition of the satellite with respect to a reference trajectory. Then, a position regulation or control of the satellite can be achieved using a regulating unit and actuators, based on and corresponding to any deviation of the present position, attitude and motion conditions of the satellite away from the reference trajectory.

Basically, it is also possible according to the invention that an improvement of the reference target data is not only achieved by a calculation and correction on-board the satellite, but also the pertinent improved and corrected reference target data can be transmitted to the satellite from an external source, for example a ground station. The stored reference target data can be used to select a certain number or set of particular reference targets after a measurement of reference targets has been carried out. In this context, the determined position data or patterns of the detected reference targets can be compared to stored reference target data or patterns, and then a selection among the reference targets is carried out. For example, those reference targets of which the deviation from the stored reference target data is smaller than a predefined threshold value can be selected in the selection process. As an example in this context, only those reference targets, such as stars for example, of which the determined position only slightly deviates from the stored reference target data, such as star charts for example, will be taken into consideration. If the reference targets are determined in such a manner, it is possible to reduce the data for the selected targets, because once an unambiguous identification and allocation of the reference targets to already-known targets has been achieved, then only certain characterizing data, such as star position, brightness or magnitude and possibly also the color spectrum must be further processed.

DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
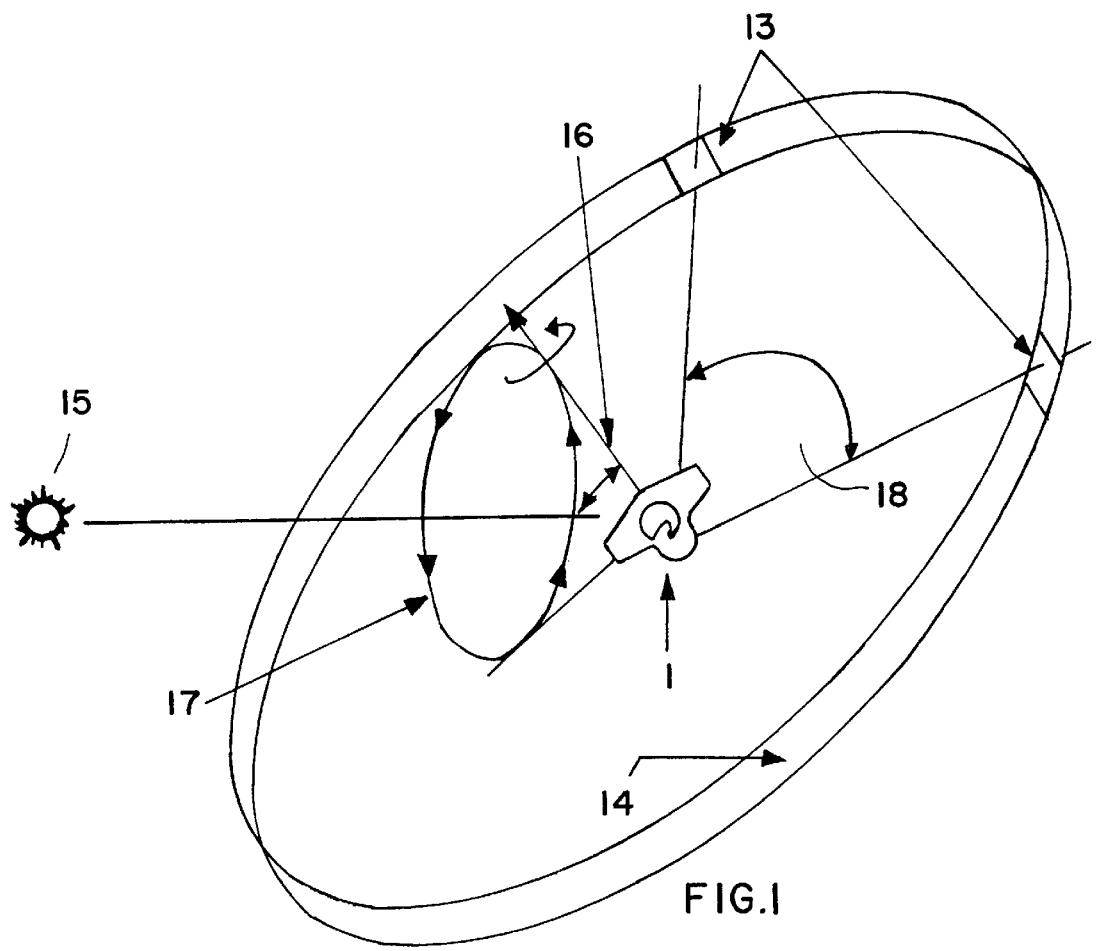
FIG. 1 is a schematic perspective view of the motion of a scanning satellite.

FIG. 1 schematically shows a scanning satellite 1 that scans a strip or band 14 of space using two sensors that are arranged in the satellite 1 in such a manner that they respectively scan two scanning areas 13 of the scan strip or band 14, which areas 13 are separated from each other by an angle 18. During the scanning process, the satellite 1 rotates about an axis 16. This axis 16 may additionally undergo a nutation motion 17, of which the frequency though is typically considerably smaller than the frequency of the rotation of the satellite 1 about the axis 16. The satellite motion can be adjusted in such a manner that the satellite axis 16 always has a constant orientation relative to a reference target such as the sun 15, for example.

A satellite as schematically indicated in FIG. 1 is generally used for scientific and research applications. Many scientific space missions that have been discussed or already planned, among them those relating to scanning satellites, make extreme demands on the position, attitude and orbit path regulation accuracy of the satellite. The following text suggests and describes a method for regulating a scanning satellite, which make it possible to achieve position regulation accuracies in the sub-milli-arc-second range (mas). The problems for a regulation or control in the sub-milli-arc-second range involve finding suitable actuators with a sufficiently small interference forces or moments, and additionally, that no sufficiently accurate reference exists, especially for scanning satellites. Namely, in missions using apparatus such as space telescopes that are fixedly or rigidly oriented to a particular target, the reference signal can be determined directly from the deviations from this target. However, on the other hand, scanning satellites require an exact maintenance or upholding of a reference trajectory. With high accuracies, this can only be controlled or monitored by the measurement of targets of which the positions are known with sufficient accuracy. Thus, if stars are used as targets, then the accuracy of the reference trajectory is determined by the accuracy of the star catalog being used, which in the best case, lies in the range of several milli-arc-seconds (mas).

In scientific missions, of which the content or subject matter particularly relates to a significant improvement of the existing star catalogs, this goal has previously been achieved in that the star positions relative to the satellite coordinate system have been measured using suitably arranged and oriented telescopes, and the inertial positions of the stars have been determined on the ground by reconstruction of the satellite motion relative to this inertial system.

In terms of the regulation or control technology, such a reconstruction in this context corresponds to a parameter identification of the satellite dynamics and of the interfering forces and moments that are acting on the satellite. In other words, the parameters of a dynamic model describing the satellite motion are determined. In this context, the quality of the results primarily depends on the characteristics of the interferences, i.e. the interference spectrum, acting on the satellite, and on the available measuring time without interference. If cold gas jets or thrust nozzles are used for carrying out the position regulation, as has been the case in missions already carried out, then the usual measuring periods are limited by the time available between the individual thrust nozzle pulses, which are to be brought into the range of one satellite rotation by means of rather complex optimizations.

Investigations have shown that the reconstruction accuracy, i.e. the quality of the parameter identification, can be significantly improved if a plurality of satellite rotations could be included within a single measuring interval. To achieve this requires that a continuously operating regulation or control is provided as a starting point. Thus, it is the subject matter of the invention described herein to provide a regulation or control concept that makes it possible to achieve uninterrupted measurements by providing a continuous regulation of the satellite position, and simultaneously minimizes the influence of critical interferences on the positional motion of the satellite so that better results can be achieved using the total system including the satellite and the ground data reconstruction, in comparison to the prior art attempts in this context. Due to the nonlinear characteristic, especially of the data reconstruction or parameter identification, the regulation and the data reconstruction cannot be considered independently of each other.

A plurality of different interferences, ranging from gravitational forces or moments to variations in the solar wind, and covering a broad frequency spectrum, have an influence on a satellite. In this context, magnetic interferences that arise due to the interaction of the earth's magnetic field or the interplanetary magnetic field with the residual dipole moment of the satellite, have been shown to be especially critical. With a careful layout of the satellite, these moments, under certain circumstances, can be reduced to an order of magnitude 1e-8 Nm.

However, such an order of magnitude of the interferences is still to be considered as significant in the context of the presently relevant sub-mas accuracy range. Thus, continuously operating actuators should have an interference spectrum that lies within the range of these naturally occurring interferences. For such extreme requirements, at the present time electrical engines are being developed, that can generate a maximum thrust of 25 micro Newtons and a minimum thrust on the order of magnitude of approximately 0.1 micro Newtons, for example. The moments generated by these engines are similarly within a limited range above a certain minimum threshold, since the effective lever arm of such engines cannot be made smaller as desired in an unlimited fashion. In this context, limitations mostly arise due to the particular satellite configurations.

Figure 2:
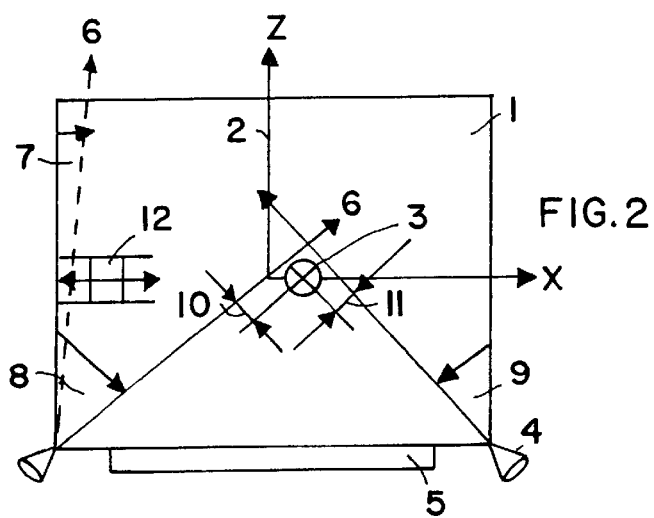
FIG. 2 is a schematic illustration of the engine or thruster nozzle arrangement of the satellite.
Figure 3:
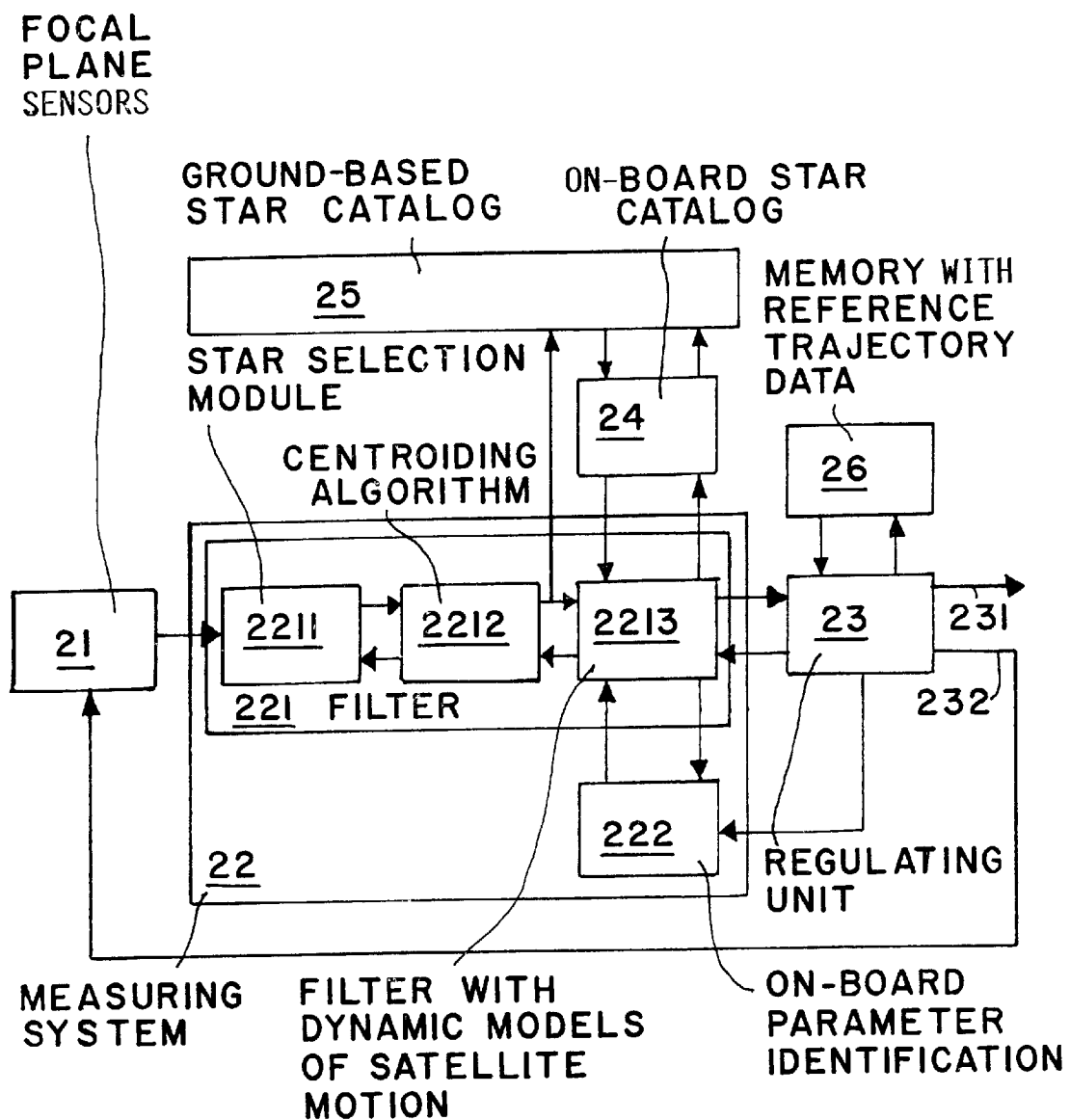
FIG. 3 is a block circuit diagram of the controlling or regulating loop of the satellite.
Figure 4:
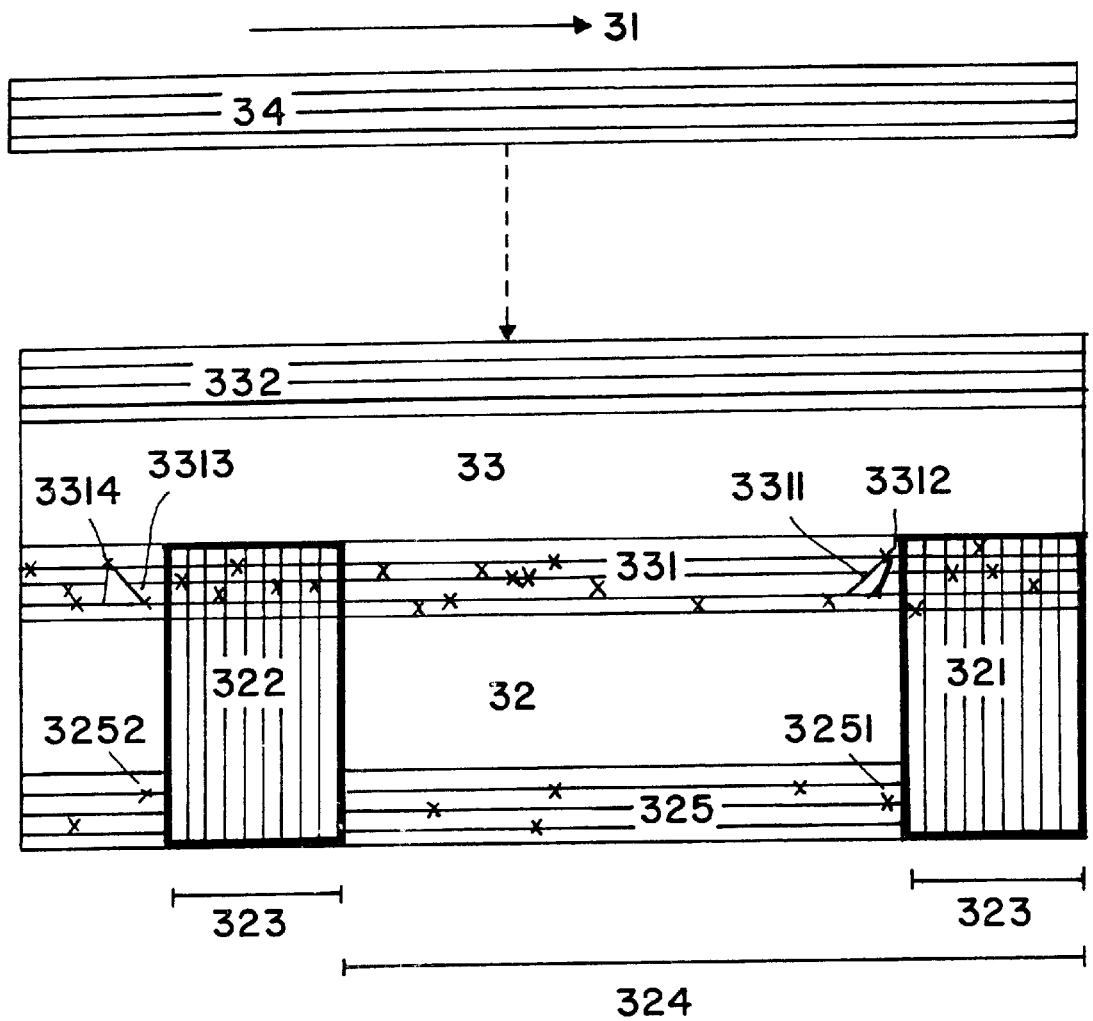
FIG. 4 is a schematic representation of the construction of the self-improving on-board star catalog.

In order to nonetheless achieve moments in the order of magnitude of the natural interference moments, in connection with the prescribed minimum thrust, FIG. 2 illustrates a special arrangement of the thrust nozzles. Namely, as shown in FIG. 2, instead of an axially oriented arrangement of the nozzles, a different nozzle arrangement is used to reduce the moment of the four nozzles 4 shown in the sectional view of FIG. 2 (with two nozzles in the plane of the drawing and two nozzles therebehind). Such four nozzles 4 are typically used for generating a thrust in the +Z direction, which corresponds to the rotation axis 16 of the satellite 1 in FIG. 1. Thereby, the center of mass 3 of the satellite does not necessarily coincide with the origin of the satellite coordinate system 2. The thrust nozzles 4 shall not be arranged in the area 5, because this space is to be utilized by some other satellite system or apparatus, such as a radiator, for example.

While previously used arrangements have four nozzles 4 arranged so that their respective main thrust directions 6 are oriented in the same direction (+Z), the arrangement of FIG. 2 shows that a tilting of the thrust nozzles outwardly makes it possible to simultaneously achieve moments about all three axes. Particularly, in FIG. 2, only the angle 7 for moments about the Y-axis is illustrated directly in the plane of the drawing, for the sake of simplicity. In this context, in order to achieve the highest possible efficiency, the inclination angle 7 between the Z-axis and the main thrust direction 6 is maintained as small as possible. In other words, the typical arrangement generates high forces in the Z-direction, but simultaneously also high moments about the X-axis and the Y-axis.

However, since for achieving the given object of the invention, the moments about all three axes must be reduced at the expense of the efficiency, the inclination angle 7 is increased to the angles 8 and 9, to the extent so that only small lever arms 10 and 11 result between the respective thrust axis of the inclined nozzle 4 and the center of mass 3. Any uncertainty regarding the position of the center of mass can be compensated in a conventional manner in that the thrust direction is controlled by supporting the thrust nozzles with suitable mechanisms, e.g. gimbal mounts, that are rotatable about two axes, or in that the location of the center of mass is adjustable by means of slidable shiftable masses 12. The former solution has the advantage that the inclination angle can once again be reduced from the angle 8 to the angle 7, during maneuvering in order to achieve higher moments.

With the above described thrust nozzle arrangement, the requirement for the continuously operating position regulation described herein can be achieved in all three axes, because with appropriate adjustments the nozzles are able to bring the moment interferences into the range of the natural interferences using nozzle lever arms 10, 11 in the centimeter range or below. Other possibilities are given by the use of a fine regulation loop with the nozzle regulation loop superimposed thereon, whereby for example, such fine regulation loops serve to position the payload relative to the satellite itself.

In the following, the generation of a reference signal for a scanning satellite will be described as an example in connection with an astrometric mission, because for such a mission the most extreme requirements or demands on the smoothness of the scanning motion arise. In this context, the "smoothness" means that the satellite only needs to minimize the deviations from the reference trajectory. The inertial lay-out or orientation of the trajectory itself must typically only be accurate to the extent of arc seconds and can therefore be monitored using existing target catalogs. For this purpose, stars will be assumed to be used as the targets to be measured in the following example description.

The highest possible smoothness of the motion is desired here, since the results of the data reduction on the ground, i.e. the parameter identification, are dependent not only on the amplitude of the interferences, but also on the complexity of the model to be taken into account. Thus, it is an object of the inventive embodiment described below to generate reference signals that make it possible to achieve the greatest possible compensation for the natural interference moments acting on the satellite as well as the interference moments that are generated by the satellite itself. In this context, the end goal is to maintain the reference trajectory as exactly as permitted by the accuracy of the on-board star position determination carried out relative to the satellite coordinate system.

To achieve this according to the invention, a possibly simplified form of the parameter identification carried out on the ground in a batch processing manner, i.e. all of the available data were simultaneously considered, is implemented in the on-board computer in a recursive form. Then, with the models determined in this manner, a star catalog located in the on-board computer is continuously improved. Then the reference signals for the regulation are generated out of this adaptive star catalog.

In order to explain the method according to the invention, the following discussion will first describe the individual elements of the regulating circuit, and then describe the interaction and operation of all these elements together.

The sensors 21 are situated in the focal plane of the instruments such as a telescope measuring the targets such as stars, for example. Typically, the sensors 21 for astrometric missions are charge coupled devices (CCDs) that are to be operated in a time delayed integration (TDI) mode. The TDI mode of operation means that the charges are moved or displaced on the CCD corresponding to the motion of the star, i.e. the motion of the satellite, in the scanning direction. To achieve this, the regulating unit 23 provides a clock signal 232 corresponding to the satellite scanning speed.

The position determination 2212 of the stars relative to the satellite coordinate system is achieved while satisfying high accuracy requirements by using model-based algorithms which can take into consideration the influence of satellite motion in addition to the model of the star image on the CCD, whereby-this influence of the satellite motion is estimated by the filter 2213. These algorithms may also be used for the data reduction, in that only the position and possibly also the size or magnitude and star color characteristic of all stars corresponding to a model are transmitted to the ground. On the other hand, all of the star images that do not correspond to this pattern or model have all of the collected data completely transmitted to the ground. For the measuring process itself, only stars with a high information content, i.e. a suitable accuracy, that correspond to the prescribed patterns will be selected by the arrangement 2211.

The reference signals for the regulating unit 23 are provided by the filter 2213, which contains models not only of the satellite dynamics, of the interferences and of the actuators, but also of the measuring process in a given case, in order to carry out the estimation of the velocities and the position. Particularly, the reference trajectory of the satellite is initially stored in and provided from the second memory 26, Since the parameters for the filter are only poorly or inaccurately known a priori, and moreover are variable in time, they must be estimated on-board by means of the parameter identification 222. For this purpose, as has already been mentioned, a possibly simplified recursive version of the ground-based data reduction process is implemented in the on-board computer.

The interplay or interaction of the filter 2213, the regulating unit 23 and the parameter identification 222 substantially corresponds to adaptive regulating or control loops that are known in regulation technology, whereby in the present context the regulating unit parameters are not adapted, but instead the parameters of the estimating filter such as the Kalman filter 2213 are adapted. The filter determines velocity signals based on the measured times for the respective transits of the selected stars, from the signals provided by plural CCDs arranged one after another in the focal plane. In this manner, together with the dynamic models available in the filter, a rather good estimation of the satellite rotation rates is already achieved. In order to further increase the accuracy, it is possible that the block 221 is combined or incorporated into an extended Kalman filter, which simultaneously estimates satellite motion and star positions relative to the satellite coordinate system. The non-linear extended Kalman filter can also be further used for the parameter identification, as needed. In other words, the Kalman filter can be further expanded or extended by including the parameter identification 222, so as to make up essentially the entire measuring system 22.

Integration of the velocity to the position leads to a drifting of the position estimation away from the actual position, which must be corrected by means of the known "strapdown" process. In other words, the estimated star positions must be compared with the known positions stored in the on-board star catalog 24, and the resulting difference signal must be used to further support the operation of the filter 2213. At this point one is faced with the problem that the a priori known star positions are much too inaccurate for the desired high accuracy of maintaining the prescribed reference trajectory. Thus, it is necessary to implement a process in the on-board computer that makes it possible to carry out a continuous improvement of the star catalog from rotation to rotation, and thus also leads to a continuous reduction of the deviations from the reference trajectory.

Since each star is measured multiple times by means of repeated scanning, a significant increase of the accuracy of the results is achieved due to the smaller scattering of the star positions after the convergence of this process in the data reduction that is carried out on the ground. In this context, the on-board star catalog is improved from time to time, as soon as the ground-based data reduction has determined more exact positions in the ground-based star catalog 25. A data exchange between the star catalog 24 of the satellite and the ground-based star catalog 25 is then carried out bi-directionally for purposes of data and error checking and control.

The process of improving the on-board target or star catalog 24 is carried out according to the invention as follows. In this example, it is assumed that the instrument for increasing the accuracy comprises two detectors which respectively have fields of view 321 and 322, and which are offset or inclined relative to each other by the angle 324, which corresponds to the angle 18 in FIG. 1. Namely, the two fields of view 321 and 322 of the two detectors respectively detect the two scanning areas 13 shown in FIG. 1. The current or present scan 32 thereby overlaps with the previous scan 33 in the area 331, and overlaps with the next subsequent scan in the area 325. The size of these overlapping areas is given by the accuracy requirements of the system and of the target density. Each star in the overlapping area of the individual scans is for the first time newly remeasured after a time period corresponding to the separation angle 324. The second measurement of the same target is carried out after a rotation of 360°. The third measurement is carried out through the second window after closing the entire circle.

Stars that are located in the overlapping area 325 and that have a high information content, i.e. a high measuring accuracy, are entered in the catalog as soon as they have left or moved out of the measuring window of the sensor 21. The data entry in this context is provided with the estimated position that has been estimated by the filter 2213. Stars that leave the windows in the overlapping area 331 with the previous scan are identified by means of the data entries that were carried out during the prior scan. In this context, known pattern recognition processes for autonomous star sensors can be used, or with high estimation accuracies of the filter 2213, the stars can be identified in connection with the estimated transit times for the angle 324 and possibly also for the completion of a full circle through 360°.

Since the position values of the identified stars come out different from one another due to the not yet smooth satellite motion between the two stars, a compensation calculation for the star positions is now carried out on-board. This compensation calculation takes into account or applies to all stars in a given time interval, of which the magnitude is dependent on the actually existing present smoothness of the scanning motion and the sampling rate of the filter 2213. The star positions in this context are taken into account correspondingly to or depending on their estimation accuracy, i.e. in addition to the respective position the present estimation accuracy is also entered for the respective star in the catalog.

After completion of the compensation calculation, the position of the new entries is corrected, and the entry for the estimation accuracy is set to the values determined by the compensation calculation. In this context, a first improvement 3252 of the position accuracy is already achieved in the described manner after the star 3251 has passed through the second window 322. The improved star positions are now provided directly to the filter 2213, and therewith the position estimation is improved. This process can be carried iteratively, in a manner similar to the known iterative extended Kalman filters, in order to further increase the accuracy.

The result of the above iteration is then taken into account in the regulation of the satellite, in that the deviations of the positions and velocities estimated by the filter 2213 (rather than the direct measurements) from the values determined from the nominal or prescribed trajectory are used for the regulation or control of the satellite. The ground-based compensation calculation is taken into account in a simple manner in that entries in the on-board catalog for the last overlap area 331 are written over by the present ground-based data comprising the positions and accuracy. The above described method can also be carried out using detectors other than CCDs and with regard to targets other than stars.

The present method and apparatus are preferably implemented in software in a reprogrammable and reusable manner, with a considerably smaller technical complexity and effort as well as a considerably smaller risk, in comparison to the complicated prior art methods of interference magnitude minimization by optimization of the hardware of the satellite and the payload.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for regulating a satellite comprising, on-board the satellite:
   a sensor adapted to detect stars as reference targets;
   a selection unit that is adapted to select at least one selected one of the reference targets, and that is connected to said sensor;
   a position determination unit that is adapted to determine respective positions of the reference targets, and that is connected to said sensor;
   a parameter identification unit that is adapted to estimate model parameters of at least one model of the satellite and of external interferences acting on the satellite;
   an updatable first memory containing a reference target catalog comprising an updatable star catalog that includes star identification data and star position data;
   a second memory containing a nominal trajectory of the satellite;
   actuators adapted to change a position of the satellite;
   a regulating unit that is connected to said second memory and to said actuators and that is adapted to control said actuators to regulate the position of the satellite with respect to said nominal trajectory; and
   a filter that is connected to said position determination unit, said parameter identification unit, said first memory, and said regulating unit, and that is adapted to revise said star position data contained in said reference target catalog based on said respective positions of the reference targets determined by said position determination unit.

2. The arrangement according to claim 1, wherein said filter, said position determination unit, and said selection unit are combined together to form an extended filter arrangement.

3. The arrangement according to claim 2, wherein further said parameter identification unit is also combined into said extended filter arrangement.

4. The arrangement according to claim 2, wherein said extended filter arrangement is an extended Kalman filter.

5. The arrangement according to claim 1, wherein said actuators comprise electric thrust engines.

6. The arrangement according to claim 5, wherein said electric thrust engines are pivotably arranged to be selectively pivotable to be oriented parallel to a common main thrust axis or each respectively along a respective tilted thrust axis that is inclined at an angle relative to said common main thrust axis.

7. A method of regulating a satellite, comprising the following steps:
   a) detecting, determining respective positions of, and selecting reference stars as reference targets;
   b) estimating model parameters of dynamic models of a motion of said satellite and of external interferences that act on said satellite;

c) calculating present position and motion conditions of said satellite and external interference conditions of said external interferences, based on said model parameters estimated in said step b), using said dynamic models;

d) comparing said determined positions of selected ones of said reference stars with stored star position data to provide a comparison result;

e) correcting said calculated present position and motion conditions dependent on said comparison result; and f) revising said stored star position data dependent on said comparison result.

8. The method according to claim 7, wherein said detecting comprises measuring a respective data set of a measured data for each said selected reference star, and said method additionally comprises further processing only a defined portion of said data set of measured data for each said selected reference star.

9. The method according to claim 7, wherein said steps c), d), e) and f) are each respectively carried out multiple times in an iterative manner.

10. The method according to claim 7, wherein said selecting of said reference stars as said reference targets in said step a) comprises comparing said determined positions of said reference stars with said stored star position data, and then selecting only those reference stars of which respectively a deviation of said determined position from said stored star position date is less than a prescribed threshold value.

11. The method according to claim 7, further comprising comparing said calculated present position and motion conditions of said satellite with a stored nominal trajectory to be followed by said satellite, and regulating a position of said satellite dependent on a result of said comparing of said calculated present position and motion conditions with said stored nominal trajectory.

* * * * *